(12) United States Patent
Karas et al.

(10) Patent No.: US 11,714,899 B2
(45) Date of Patent: *Aug. 1, 2023

(54) COMMAND INJECTION IDENTIFICATION

(71) Applicant: JFROG LTD., Netanya (IL)

(72) Inventors: Asaf Karas, Givataayim (IL); Or Peles, Tel Aviv (IL); Meir Tsvi, Tel Aviv (IL); Anton Nayshtut, Netanaya (IL)

(73) Assignee: JFROG LTD, Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,427

(22) Filed: Jun. 27, 2022

(65) Prior Publication Data

US 2022/0335122 A1 Oct. 20, 2022

Related U.S. Application Data

(63) Continuation of application No. 16/687,203, filed on Nov. 18, 2019, now Pat. No. 11,403,391.

(51) Int. Cl.
*G06F 21/54* (2013.01)
*H04L 9/40* (2022.01)
*G06F 21/55* (2013.01)

(52) U.S. Cl.
CPC ............ *G06F 21/54* (2013.01); *G06F 21/554* (2013.01); *H04L 63/1466* (2013.01); *G06F 2221/033* (2013.01)

(58) Field of Classification Search
CPC .............................. G06F 21/54; H04L 63/1466
See application file for complete search history.

(56) References Cited

U.S. PATENT DOCUMENTS

| | | | | |
|---|---|---|---|---|
| 7,437,759 | B1* | 10/2008 | Szor | G06F 21/52 726/25 |
| 2006/0288420 | A1* | 12/2006 | Mantripragada | G06F 21/51 726/25 |
| 2008/0016314 | A1* | 1/2008 | Li | H04L 63/1441 711/E12.091 |

(Continued)

OTHER PUBLICATIONS

Non-Final Office Action issued for U.S. Appl. No. 16/687,203 electronically dated Feb. 9, 2022.

*Primary Examiner* — William S Powers
(74) *Attorney, Agent, or Firm* — Myers Wolin, LLC

(57) ABSTRACT

A method, system and product for command injection identification. An input hook function is configured to be executed in response to a potential input provisioning event. The input hook function is configured to perform: analyzing a potential input of the potential input provisioning event to identify whether the potential input comprises a command separator and an executable product; and in response to identifying the command separator and the executable product, recording a suspicious input event indicating the command separator and the executable product. An execution hook function is configured to be executed in response to a potential execution event. The execution hook function is configured to perform: in response to a determination that an execution command of the potential execution event comprises the command separator and the executable product of the suspicious input event, flagging the execution command as a command injection attack.

20 Claims, 7 Drawing Sheets

(56) References Cited

U.S. PATENT DOCUMENTS

2012/0317647 A1* 12/2012 Brumley ............... G06F 21/577
                                                          726/25
2017/0272462 A1* 9/2017 Kraemer ................ G06F 21/52
2017/0359308 A1* 12/2017 Pal ...................... H04L 63/0281

* cited by examiner

COMMAND INJECTION IDENTIFICATION

CROSS-REFERENCE TO RELATED APPLICATION

This application is a continuation of U.S. patent application Ser. No. 16/687,203, filed Nov. 18, 2019, all of which is hereby incorporated by reference in its entirety without giving rise to disavowment.

TECHNICAL FIELD

The present disclosure relates to cyber security in general, and to methods, products and systems for online detection of command injection attacks, in particular.

BACKGROUND

Code injection is the exploitation of a computer bug that is caused by processing invalid data. Injection is used by an attacker to introduce (or "inject") code into a vulnerable computer program and change the course of execution. The result of successful code injection can be disastrous, for example by allowing computer worms to propagate.

Code injection vulnerabilities occur when an application sends untrusted data to an interpreter. Injection flaws are most often found in Structured Query Language (SQL), Lightweight Directory Access Protocol (LDAP), XPath, or NoSQL queries; OS commands; eXtensible Markup Language (XML) parsers, Simple Mail Transfer Protocol (SMTP) headers, program arguments, or the like.

Injection can result in data loss or corruption, lack of accountability, or denial of access. Injection can sometimes lead to complete host takeover.

Code injection techniques are popular in system hacking or cracking to gain information, privilege escalation or unauthorized access to a system. Code injection can be used malevolently for many purposes, including: arbitrarily modifying values in a database through SQL injection; installing malware or executing malevolent code on a server by injecting server scripting code (such as PHP™ or Active Server Pages (ASP)); privilege escalation to root permissions by exploiting Shell Injection vulnerabilities in a "setuid" root binary on UNIX™, or Local System by exploiting a service on Microsoft Windows; attacking web users with Hyper Text Markup Language (HTML)/script injection (Cross-site scripting); or the like.

BRIEF SUMMARY

One exemplary embodiment of the disclosed subject matter is a computer program product comprising a non-transitory computer readable storage medium retaining program instructions, which program instructions when read by a processor, cause the processor to perform: configuring an input hook function to be executed in response to a potential input provisioning event, wherein the input hook function is configured to perform: analyzing a potential input of the potential input provisioning event to identify whether the potential input comprises a command separator and an executable product; and in response to identifying the command separator and the executable product, recording a suspicious input event indicating the command separator and the executable product; configuring an execution hook function to be executed in response to a potential execution event, wherein the execution hook function is configured to perform: in response to a determination that an execution command of the potential execution event comprises the command separator and the executable product of the suspicious input event, flagging the execution command as a command injection attack.

Optionally, said program instructions, when read by a processor, cause the processor to perform: preventing execution of a command that is flagged as a command injection attack.

Optionally, said program instructions, when read by a processor, cause the processor to perform: obtaining a list of executable products available for execution in an execution environment; wherein the execution hook is configured to be executed in response to the potential execution event occurring in the execution environment; and wherein the executable product is listed in the list of executable products available for execution in the execution environment.

Optionally, said flagging the execution command as a command injection attack is contingent on the execution command comprising a second executable product.

Optionally, the suspicious input event indicates a timestamp of the potential input provisioning event; and wherein said flagging the execution command is contingent on a time correlation between the potential input provisioning event and the potential execution event.

Optionally, the execution hook function is configured to perform: in response to a determination that the execution command is a delayed execution command, performing said flagging irrespective of the time correlation between the potential input provisioning event and the potential execution event.

Optionally, in response to said flagging, adding the execution command to a blacklist of prohibited commands; wherein the execution hook function is further configured to flag a command as the command injection attack in response to identifying that the command is included in the blacklist of prohibited commands, whereby preventing retrial execution attempts of the command injection attack.

Optionally, the determination that the execution command comprises the command separator and the executable product of the suspicious input event, further comprises a determination that the execution command is a write command affecting delayed execution of another command.

Optionally, the write command is a command to update a configuration file utilized by a delayed execution process.

Optionally, the determination that the execution command comprises the command separator and the executable product of the suspicious input event, further comprises a determination that the execution command is a command to write to an executable script file.

Optionally, the execution command is a command to execute an executable script file, wherein the determination that the execution command comprises the command separator and the executable product is performed with respect to a content of the executable script file.

Optionally, the potential input provisioning event is an execution of a string generation function.

Optionally, the input hook function is configured to perform: determining whether an input string provided to the string generation function is obtained from a read-only memory region, thereby identifying a hard-coded input string; and ignoring any command separator and any executable product that is the hard-coded input string, whereby recording suspicious string manipulation events that are not based on hard-coded input strings.

Optionally, the potential input provisioning event is a network data receipt event, whereby the input hook function is a network.

Another exemplary embodiment of the disclosed subject matter is a method comprising: configuring an input hook function to be executed in response to a potential input provisioning event, wherein the input hook function is configured to perform: analyzing a potential input of the potential input provisioning event to identify whether the potential input comprises a command separator and an executable product; and in response to identifying the command separator and the executable product, recording a suspicious input event indicating the command separator and the executable product; configuring an execution hook function to be executed in response to a potential execution event, wherein the execution hook function is configured to perform: in response to a determination that an execution command of the potential execution event comprises the command separator and the executable product of the suspicious input event, flagging the execution command as a command injection attack.

Yet another exemplary embodiment of the disclosed subject matter is a computerized apparatus having a processor, the processor being adapted to perform the steps of: configuring an input hook function to be executed in response to a potential input provisioning event, wherein the input hook function is configured to perform: analyzing a potential input of the potential input provisioning event to identify whether the potential input comprises a command separator and an executable product; and in response to identifying the command separator and the executable product, recording a suspicious input event indicating the command separator and the executable product; configuring an execution hook function to be executed in response to a potential execution event, wherein the execution hook function is configured to perform: in response to a determination that an execution command of the potential execution event comprises the command separator and the executable product of the suspicious input event, flagging the execution command as a command injection attack.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
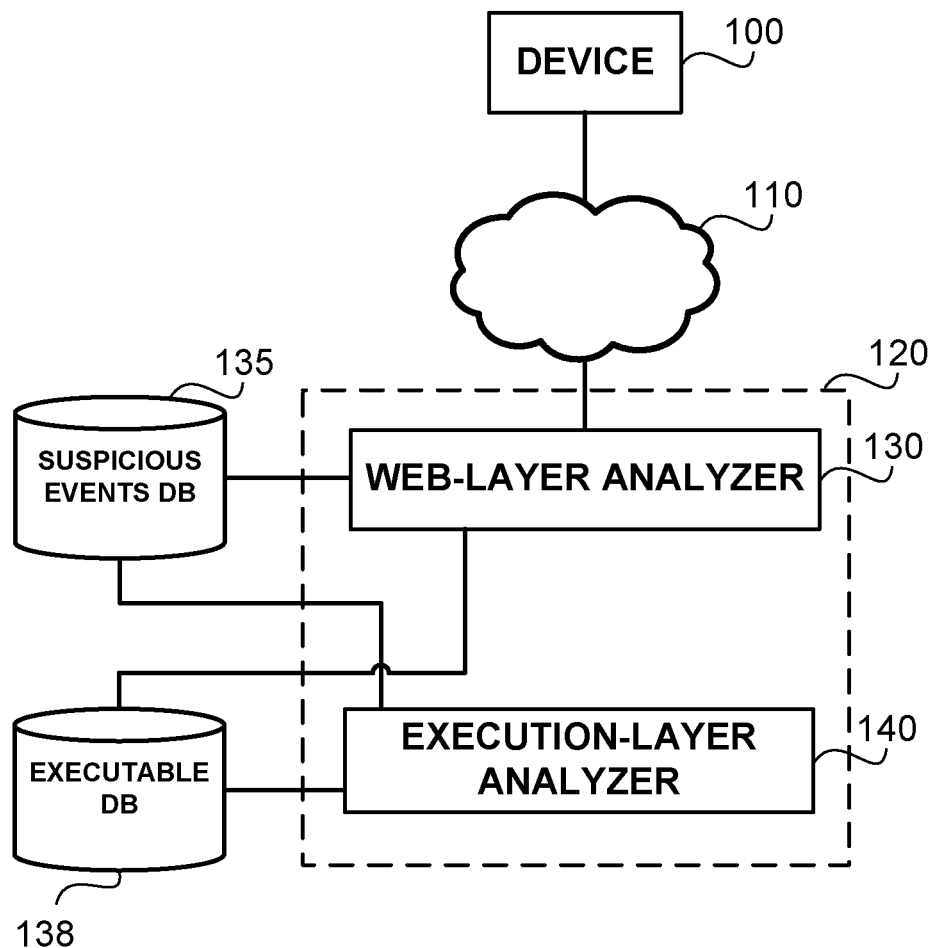
FIG. 1 shows a computerized environment, in accordance with some exemplary embodiments of the disclosed subject matter.

One technical problem dealt with by the disclosed subject matter is to identify a code injection attack during runtime, in a reliable manner. In some exemplary embodiments, the monitoring technique should be able to identify code injection attacks and prevent them from being executed, thus defending the computerized system. However, reliability of the technique is not only in a high rate of correct identification of attacks, but also in the low rate of false positive identifications. A technique that yields a relatively high false positive rate may become obsolete as users may learn to ignore its alerts, may disable it to allow them to routinely operate, or the like. For this reason, techniques that are based on static analysis tend to perform poorly.

In some cases, potential input that may appear to be an attempt to inject code, may be benign. Additionally, or alternatively, executed commands that match a code injection pattern, may originate from the software itself, and may part of the routine operation of the software.

One technical solution is to provide a mechanism to detect and block command injection attacks based on a two layered approach. The layered approach includes an input hook that is in charge of marking potential malicious code-injection inputs, and an execution hook for detecting the execution attempt of such potential malicious code-injection inputs.

In some exemplary embodiments, the input hook may be a hook function relating to receipt of input from network. For example, the input hook may be placed in a web server module, as a proxy that is placed in front of network daemons, such as the web server, or Universal Plug and Play (UPnP) server, or the like. Additionally, or alternatively, the input hook may be a hook that is executed when string manipulation is performed.

In some exemplary embodiments, in order to reduce potential false positive rates, time-based correlation between the input and the execution may be performed. In some cases, the executed command may reflect on the time-based correlation requirements, such as in case of a delayed execution mechanism.

In some exemplary embodiments, the detection may be based on analysis of the software being protected. For example, in case of a firmware of an Internet of Things (IoT) device, the firmware may be analyzed to identify a list of potential executable products, such as executable binaries, scripts, or the like. Code injection attempts that would not cause execution of any executable product in the firmware may be disregarded.

In some exemplary embodiments, an input hook function may be configured to be executed in response to a potential input provisioning event. The input hook function may be configured to analyze a potential input of the potential input provisioning event to identify whether the potential input comprises a command separator and an executable product. In some exemplary embodiments, the executable product may be any executable product that is potentially executable in the execution environment. In some exemplary embodiments, in response to an identification of a command separator and the executable product, a suspicious input event indicating the command separator and the executable product may be recorded. Additionally, or alternatively, the recordation may include a timestamp of the input provisioning event.

In some exemplary embodiments, the command separator may be a character or combination of characters that are configured to separate between two commands. For example, in LINUX™ Operating System (OS), the command separator may be a semicolon (;), a logical AND operator (&&), a logical OR operator (||), a pipeline (|), or the like. It is noted that in different command execution environments, such as different shells, different command separators may exist.

In some exemplary embodiments, a list of available executable products may be utilized to determine whether a string is an executable product. The list may be created online or offline. Additionally, or alternatively, the list may be populated from static analysis of the execution environment. Additionally, or alternatively, the list may be populated during boot time or every interval based on analysis of the existing execution environment. Additionally, or alternatively, each potential executable product may be examined, on the fly, by checking whether the provided path exists in the filesystem and leads to a file having executing permissions.

In some exemplary embodiments, an execution hook function may be configured to be executed in response to a potential execution event. The execution function may be configured to be responsive to an execution attempt. The executed command may be analyzed to determine if the execution command comprises the command separator and the executable product of the suspicious input event. If so, the execution command may be flagged as a command injection attack. The flagged command may be utilized to raise an alert, send a warning message, prevent the execution of the command, or the like.

In some exemplary embodiments, the execution hook may flag only execution commands that comprise two executable products. In some exemplary embodiments, if the execution command comprises only a single executable product, then it may be a benign command that does not attempt to perform a second, injected, command. Hence, such additional requirement may, in some circumstances, reduce potential false positive identifications.

In some exemplary embodiments, the flagging of the execution command as command injection attack may be contingent on a time correlation between the input provisioning event identified and recorded by the input hook function and between the execution event analyzed by the execution hook function. In some exemplary embodiments, the input provisioning event may be considered as valid for a predetermined timeframe. For example, in the execution hook function, only input provisioning events that were recorded within a recent time window of about one minute, ten minutes, one hour, or the like, may be examined. Old input provisioning events may be ignored, as it may be unlikely that an old input provisioning event would be utilized as part of a command injection attack, a long time after it had occurred.

In some exemplary embodiments, the execution hook function may be configured to identify whether the execution command is a delayed execution command. For example, in LINUX™, delayed execution may be performed by a predetermined process named "crond". When an execution by "crond" is identified, the timestamp may be ignored, and identification of code injection attempts may be determined regardless of the timing of the relevant input provisioning events. In some exemplary embodiments, input provisioning events are not invalidated over time with respect to delayed execution, as the execution may have been defined in an earlier time, such as in proximity to the input provisioning event itself.

In some exemplary embodiments, a flagged execution command may be added to a blacklist. In some exemplary embodiments, the blacklist may be consulted before attempting to utilize any other detection mechanism. In some exemplary embodiments, the blacklist may not be invalidated overtime, and may be used to prevent re-execution attempts of flagged execution commands whose corresponding input provisioning event may have already been invalidated due to the passing of time. In some exemplary embodiments, the blacklist may be utilized to prevent retrial execution attempts of the command injection attack. It is noted that retrial attempts may be an attempt to execute the exact same execution command, and hence, no complicated string analysis may be performed, but rather only a simple string comparison attempt to determine whether the two strings are identical. In some exemplary embodiments, such a mechanism may also provide for a performance improvement as it is relatively simple and can be implemented efficiently, such as using a Bloom filter, a hash table, or the like, so as to have computation complexity of O(1), as opposed to an attempt to re-analyze all previously identified input provisioning events.

In some exemplary embodiments, the execution hook function may determine whether the executed command is a write command that is configured to affect delayed execution of another command. Write commands may be inspected to analyze the content that is being written to identify potential code injection attacks.

In some exemplary embodiments, in LINUX™, a command that writes to "crontab" file may be a command that has the potential to affect delayed execution of another command. The "crond" process may be configured to consult the "crontab" file, which serves as a configuration file thereof, to determine which command to execute and when. In case of a write command to the delayed execution, input provisioning events that may inspected may be limited to recent input provisioning events that were provided within the predetermined timeframe.

In some exemplary embodiments, a command that writes to a script file may be analyzed in a similar manner. In some exemplary embodiments, a script file may be a text file that has executable permissions. Additionally, or alternatively, a script file may be a text file beginning with the shebang character sequence (#!). Additionally, or alternatively, a script file may be a text file having a predetermined extension, such as a ".sh" suffix, a ".pl" suffix, a ".bat" suffix, or the like. It is noted that the script file may not necessarily have execution permissions and may be executed using another command. For example, in LINUX™, the command "bash script" would invoke a process to execute the bash shell and to execute by such process the commands written in the file "script" regardless of whether the file "script" has an execution permission. In some exemplary embodiments, a list of available script files in the execution environment may be populated, in an offline or online manner.

In some exemplary embodiments, the potential input provisioning event may be an execution of a string generation function. In some exemplary embodiments, a command injection attack may rely on one or more string generation functions for preparing the command that will be passed for execution. In some exemplary embodiments, the string generation function may be a string building function or string manipulation function such as sprint, strcat, snprintf, strcpy, or the like. In some exemplary embodiments, the output string may be passed to a system call, to a popen call, or the like, in order to be executed.

In some exemplary embodiments, the string generation function may be a common standard library string utility function that is available in the execution environment. The sprintf function, as an example, is one of the printf( ) family. The functions in the printf( ) family produce output according to a string known as a format-string. The first two arguments passed to sprintf are the destination buffer where the produced string outputs go, and the format-string that specifies how subsequent arguments are converted to output. The sprintf function may get additional parameters depending on the format string. For example, the "% s" token represents a string argument. Thus, for each appearance of the "% s" token in the format-string, an additional string argument may be passed to the sprintf function, and these strings will appear in the produced output. The strcat function, as another example, receives two strings as parameters, dest and src. The strcat function appends the src string to the dest string.

In some exemplary embodiments, the input function hook may be configured to be activated when a string generation function is invoked. In some exemplary embodiments, if the string generation function is of the printf-family, the format string part may be ignored. In some exemplary embodiments, this may reduce the risk of false positive identifications. In some exemplary embodiments, the format string may be less likely to be user controlled. In some exemplary embodiments, concatenation of commands appearing in the format string may likely be a desired functionality defined by the developer. In such a case, the format string may comprise a command separator. However, appearance of a command separator in the other parameters that correspond to the % s tokens may be an irregular and suspicious event. It is also noted that if the format-string is user-controlled there may be other issues relating to format-string vulnerabilities, which may be handled separately. Hence, the disclosed subject matter may ignore the format-string, so as to reduce false positive identifications of attacks.

In some exemplary embodiments, input string that is used in the string generation function and that arrives from a read-only memory region, may be assumed to be safe and ignored for the sake of the analysis of the disclosed subject matter. In some exemplary embodiments, in case such string satisfies the other conditions to be considered suspicious (e.g. includes a command separator and an executable product), and no other actual suspicious strings are used as input to the current string manipulation function call, the output of the string generation function may be considered as safe. The output—both content and memory location—may be marked in a white list table. The marking may or may not include a timestamp.

In some exemplary embodiments, a string that is provided as input to the string generation function and that arrives from a non-read-only memory region may be analyzed. If such string is not marked as a time-valid record in the white list table, and if such a string includes a command separator and an executable product, the output of the string generation function—both content and memory location—may be marked as a suspicious input event. In some exemplary embodiments, the suspicious input event may be marked with a timestamp. In some exemplary embodiments, if one of the inputs of a string generation function is suspicious, then the output of such function may be considered suspicious as well. Put differently, suspicious strings may be regarded as contagious.

In some exemplary embodiments, In order to decrease the amount of false positives results, memory mappings of the execution environment may be utilized to identify read-only memory region. For example, in LINUX™, process memory maps may be analyzed. It is noted that the execution environment may comprise different memory regions, each region may have its own access permissions. Each region may or may not have read permissions, write permissions and execution permissions. In some exemplary embodiments, some of the strings that are used in a program may be hard-coded strings that are a part of the executable file itself. Such strings may be disregarded and not considered as input from a user. In some cases, such strings may be mapped to a non-writable memory region. Hence, such strings, which may include command executions, may be ignored, even if they include separator fields and known binary names, as they are not the result of a command injection attack. #

One technical effect of the disclosed subject matter is improving command injection attack detection. The detection may be more accurate, and less prone to false positive indications. Hence, such a detection may be more useful to other techniques that are utilized, in which a high rate of false positive indications makes the technique impractical.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

The disclosed subject matter is described below while making specific examples to LINUX™ OS. However, such examples are for illustration purposes only and the disclosed subject matter is applicable to other operating systems, and relates to corresponding or similar functionalities available therein.

Referring now to FIG. 1 showing a computerized environment, in accordance with some exemplary embodiments of the disclosed subject matter.

Execution Environment 120 may be implemented by one or more devices, capable of executing binaries and other executable products. In some exemplary embodiments, Execution Environment 120 may be part of an IoT device, having OS, such as LINUX™ and firmware for performing desired functionality. Additionally, or alternatively, Execution Environment 120 may be connected to a Network 110, such as the Internet, a Local Area Network (LAN), a Wide Area Network (WAN), or the like. Devices, such as Device 100, may communicate with Execution Environment 120, and provide input thereto. In some exemplary embodiments, Device 100 may attempt to perform a command injection attack by providing malicious input which attempts to cause Execution Environment 120 to execute a functionality desired by Device 100 but not intended by the designer of Execution Environment 120.

In some exemplary embodiments, A Web-Layer Analyzer 130 may be configured to analyze requests provided over Network 110, such as originating from Device 100. As an example, Hypertext Transfer Protocol (HTTP) requests received from Network 110 may be analyzed. As an example, different HTTP methods may be processed differently. For example, in case of a GET HTTP method, a DELETE HTTP method and a HEAD HTTP method, the Uniform Resource Locator (URL) provided in the HTTP request may be analyzed. As another example, in case of a POST HTTP method, the URL and the body part may be analyzed. Web-Layer Analyzer 130 may configure a hook function to be invoked in response to receipt of a web-based input. In some exemplary embodiments, the hook may be implemented in a web server module. Additionally, or alternatively, the hook may be implemented as a proxy that is located in front of the network daemons of Execution Environment 120 (e.g., web server, UPNP server, or the like). Additionally, or alternatively, Web-Layer Analyzer 130 may implement the hook, analysis or combination thereof, off-device in a different execution device other than Execution Environment 120. For example, the analysis may be performed using a network sniffer physically installed on the network connection to Execution Environment 120.

In some exemplary embodiments, in case Web-Layer Analyzer 130 identifies a suspicious input, a suspicious event is recorded in Suspicious Events Database (DB) 135. In some exemplary embodiments, the suspicious event is recorded together with an indication of the time of the event. The input may not be blocked and the Execution Environment 120 may be allowed to process the input.

In some exemplary embodiments, Execution-Layer Analyzer 140 may be configured to analyze execution attempts within Execution Environment 120. In some exemplary embodiments, Execution-Layer Analyzer 140 may configure an execution hook function to be invoked when a command is provided for execution. For example, an OS-hook may be defined and configured to invoke the analysis execution hook function. In some exemplary embodiments, in LINUX™, the "system" and "popen" library functions may be utilized in order to invoke execution of a command and one or more hooks may be set accordingly.

In some exemplary embodiments, a suspicious event may be recorded when an input that is provided includes both a command separator and an executable product.

In some exemplary embodiments, the command separator may be a token that is used to indicate a separation between two different commands by a command interpreter utilized by Execution Environment 120. For example, in LINUX™, a default shell may be defined per user. When a command is executed, the default shell may be utilized for the execution. The command separator may be a token such as ";", "|", "&&", "||", or the like. Additionally, or alternatively, different commands separator may be relevant for different execution scenarios, such as depending on the specific shell defined for the user, depending on whether another shell is specifically being invoked (e.g., the command "sh cmd" would force the execution of the Bourne Shell™ command interpreter). In some exemplary embodiments, a list of command separators may be available for the analysis. Additionally, or alternatively, the list may indicate for each command separator, for which command interpreter it applies.

In some exemplary embodiments, the executable product may be a command that can be executed by Execution Environment 120. In some exemplary embodiments, a list of executable products available in Execution Environment 120 may be retained in Executable DB 138. The list may be determined by searching the file system for executable binaries, executable scripts, or the like, that are available therein. It is noted that a superset of potential executable products may be determined and a subset thereof may be correct. For example, there may be a set of available binaries and scripts in a specific LINUX™ release (e.g., a specific release by UBUNTO™, by RED HAT™, or the like). However, some of the binaries and scripts may be removed from Execution Environment 120. Such may be the case if the storage available for Execution Environment 120 is limited, as may occur with IoT devices and other devices in which the execution environment is provided mainly for the sake of executing firmware.

In some exemplary embodiments, Execution-Layer Analyzer 140 may analyze execution commands and flag commands that correspond to suspicious events recorded in Suspicious Events DB 135. In some exemplary embodiments, the correlation may be a correlation in text, such as both including the same command separator, executable products, or the like. Additionally, or alternatively, the correlation may relate to the timing of the events, such that the execution event occurs within a predetermined timeframe after the suspicious event occurred. In some exemplary embodiments, a constraint to ensure that there is a time correlation may be CT−NDT≤VALID_PERIOD, where CT is the current time (in which the execution command is being analyzed) and NDT is the net detection time recorded for the event. VALID_PERIOD may be a predefined parameter, which may or may not be controlled by a user, such as an administrator. In some exemplary embodiments, an entry for which CT−NDT>VALID_PERIOD may be considered as time invalidated. In some exemplary embodiments, a query may filter out any time invalidated records, and ensure correlation is determined only with events that are still relevant at the time the command is executed. For example, the query may require the constraint that CT−VALID_PERIOD≤NDT.

In some exemplary embodiments, flagging of execution commands may be contingent on the command comprising at least one additional executable product other than that appearing in the suspicious event. As an example, consider the input of "; rm*", which may be recorded as a suspicious event. If the input is being used in a command, for example in an "ls" command that is followed by the user input, the executed command would be "ls; rm*". Hence, in such a case, there are two different executable products—"rm" which was also included in the suspicious input event, and "ls".

In some exemplary embodiments, flagging of execution commands and analysis thereof may depend on the command that is being executed.

In some exemplary embodiments, if the executed command is a delayed execution command, such as a command executed by "crond" process in LINUX™, then the analysis may be irrespective of the timing of the entries in Suspicious Events DB 135.

As another example, different analysis may be performed when the executed command is a command to update a configuration file of a delayed execution command, such as writing to the "crontab" file utilized by the "crond" process.

As yet another example, different analysis may be performed when the executed command is a command to write to a script file. The script file may be a textual file comprising strings that can be executed by a command interpreter. In some exemplary embodiments, the script file may be identified as such based on the execution permissions, such as having at least execution permission with respect to one type of user. It is noted that in some cases, the script file may be updated before it is being given execution permissions, and thus the determination of whether a file is a script file may not necessarily rely on execution permissions. In some exemplary embodiments, the script file may be identified based on its content. For example, a script file may comprise a shebang character sequence in its beginning. Additionally, or alternatively, the scrip file may have an extension indicative of it being a script file, such as ".sh", ".BAT", ".pl", or the like. In some exemplary embodiments, a classifier may be trained to identify textual files and determine whether or not they are script files. Such classifier may be invoked to determine whether or not the updated file is a script file.

As yet another example, different analysis may be performed when the executed command is a command to execute a script. In such a case, the content of the script file may be reviewed to determine whether the content thereof corresponds to any suspicious event in Suspicious Events DB 135. Additionally, or alternatively, the content of the script may be compared to the events in Suspicious Events DB 135 irrespective of the timing thereof, as the input may have been placed in the script a significant time prior to the execution of the script. For example, a ".login" script that is invoked when a user logs in into the OS may be updated and executed only several days or even weeks later.

In some exemplary embodiments, Execution-Layer Analyzer 140 may flag execution commands as being command injection attacks. A command injection attack may be blocked from execution, may be logged, may be provided to an IT professional, or the like.

In some exemplary embodiments, a flagged execution command may be added into a blacklist. In some exemplary embodiments, the blacklist may be implemented using a string-based list, a hash table, a Bloom filter, or the like, to provide for an efficient query checking whether an execution command was previously flagged. If the execution command was previously flagged, the execution command may be flagged once again and an appropriate responsive action may be taken, without relying on identifying a corresponding suspicious event. In some cases, the corresponding suspicious event may have already been time-invalidated. For example, the execution command may be flagged during a first execution attempt, based on a time-correlated suspicious input event. After the execution is blocked, a retrial attempt to execute the same command may be performed several times. However, the retrial attempts may be performed after the valid period ends, such as after several minutes, after an hour, or the like. In such a case, the relevant suspicious event record may be time invalidated, but the execution command may still be identified as part of a command injection attack using the blacklist. In some exemplary embodiments, the blacklist may be used to identify execution commands that are identical to execution commands previously blocked.

It is noted that in some embodiments, a string-layer analyzer (not shown) may be implemented in addition to or instead of Web-Layer Analyzer 130. The string-layer analyzer may analyze invocations of string generation functions and identify attempts that may be relevant for command injection attacks.

Figure 2A:
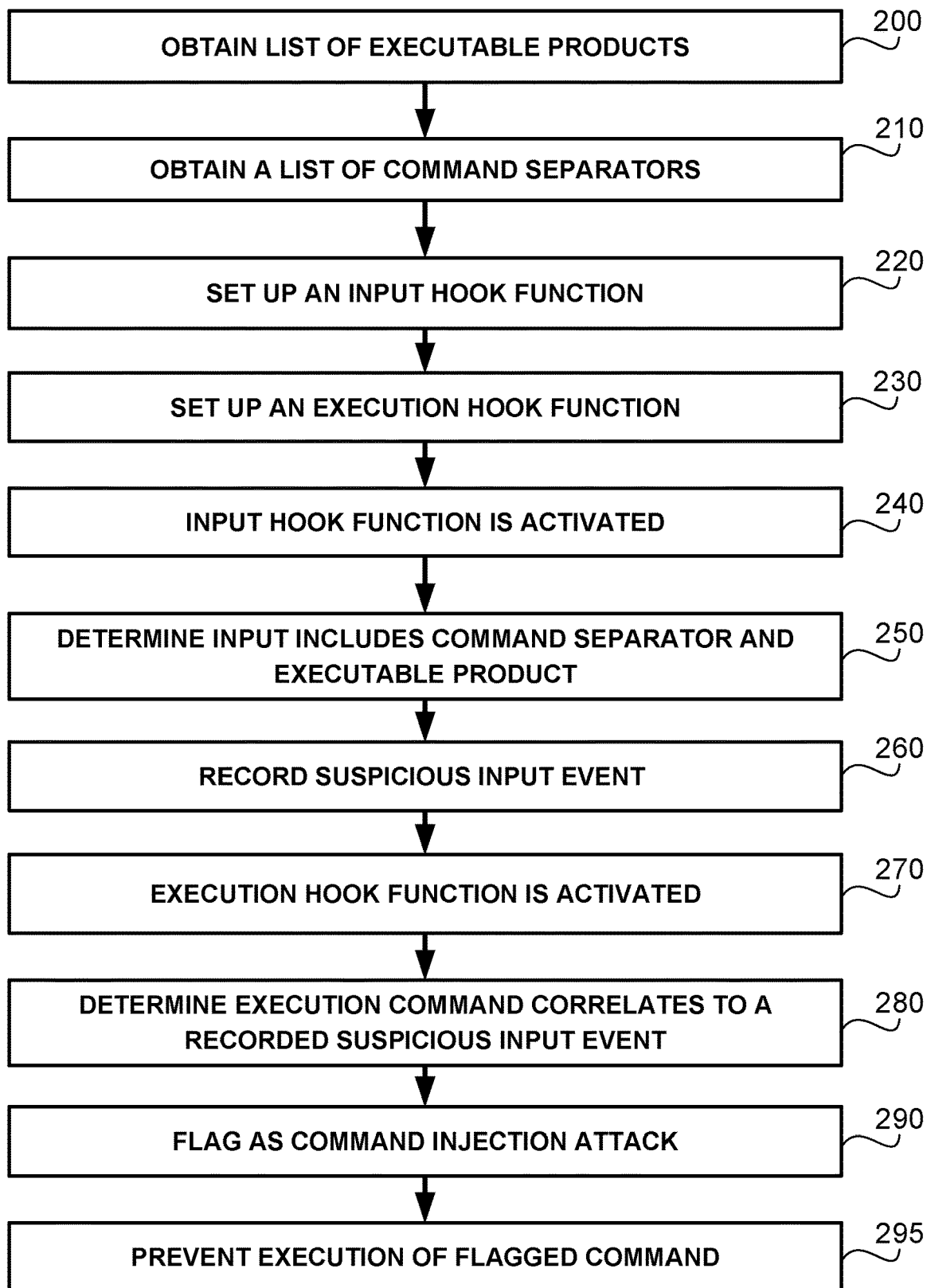
FIGS. 2A-2H show flowchart diagrams of methods, in accordance with some exemplary embodiments of the disclosed subject matter.

Referring now to FIG. 2A showing a flowchart diagram of a method, in accordance with some exemplary embodiments of the disclosed subject matter.

On Step 200, a list of executable products may be obtained. In some exemplary embodiments, the list may be populated on the fly based on the current state of the execution environment. Additionally, or alternatively, the list may be populated on boot of the device. Additionally, or alternatively, the list may be populated periodically. Additionally, or alternatively, the list may be populated in advance and used. In some exemplary embodiments, the list may be populated by searching for all binaries or other executable products in the filesystem that can be executed. In some exemplary embodiments, for each executable product, one or more conditions on its executability, such as in view of user permissions, may be noted in the list, enabling determination of a list of executable products that be executed in a current context. In some exemplary embodiments, the list may comprise known binaries and scripts that are present in the firmware. In some exemplary embodiments, the list may be verified, such as by attempting the determine for each item in the list, whether the path exists on the filesystem at runtime. In some exemplary embodiments, the list may be retained in a DB, such as 138 of FIG. 1.

On Step 210, a list of command separators may be obtained. The list may be provided by a user, hardcoded, or obtained for an external resource, such as documentation of the execution environment and command interpreters thereof.

On Step 220, an input hook function may be set up. The input hook function may be configured to be invoked when a potential input provisioning event may occur. In some exemplary embodiments, the potential input provisioning event may be a network data receipt event. The input hook function may be a network hook function configured to analyze potential input received from a network, such as 110 of FIG. 1. Additionally, or alternatively, the potential input provisioning event may be an execution of a string generation function. The input hook function may be a string manipulation hook function configured to analyze strings that are generated using string generation functions, such as the library functions of LINUX™ sprintf, strcat, strcpy, snprintf, or the like.

On Step 230, an execution hook function may be set up. The execution hook function may be configured to be invoked upon an attempt to execute a command. When a potential execution event is detected, the execution hook function may be invoked. The execution hook function may analyze the execution command that is intended to be executed by the potential execution event. The execution hook function may be configured using an OS mechanism, such as to be invoked in response to popen or system library functions invocations in LINUX™. It is noted that the execution hook function is invoked prior to the actual execution of the execution command, thereby providing the opportunity to block the execution thereof (e.g., as is exemplified in Step 295).

On Step 240, the input hook function is activated. The activation of the input hook function is due to an input provisioning event to be analyzed. Steps 250-260 may be performed by the input hook function.

On Step 250, it is determined whether the input includes a command separator and an executable product. The determination may be performed using the lists obtained in Steps 200-210.

On Step 260, a suspicious record event may be recorded. The suspicious record event may be recorded in a database, such as 135 of FIG. 1. In some exemplary embodiments, the suspicious record event may record the command separator, the executable product, a timestamp of the event (or approximation thereof, such as current time when the event is recorded), or the like.

On Step 270, the execution hook function is activated. The activation of the execution hook function is due to a potential execution event, such as a command that was executed using the system library function. The execution command may be the parameter of the system library function, e.g., the command that is to be executed. For example, the execution of system ("ls; rm*"), would result in the string "ls; rm*" being referred to as the execution command. In some exemplary embodiments, the execution command is a string that is being passed to a command interpreter, such as BASH Shell™, Bourne Shell™, PERL™, or the like. Steps 280-290 may be performed by the execution hook function. In some exemplary embodiments, Step 295 may or may not be performed by the execution hook function.

On Step 280, it may be determined whether the execution command correlates to a recorded suspicious input event. In some exemplary embodiments, the correlation may be manifested in the execution command comprising the exact text of the recorded suspicious input event, as is. Additionally, or alternatively, the correlation may be manifested in the execution command comprising all portions of the recorded suspicious input events, e.g., comprising the command separator recorded in the recorded suspicious input event and the executable product recorded in the recorded suspicious input event, even if they appear differently than in the input provisioning event. For example, if the input provisioning event is "; rm*", the execution command stating "rm f1 f2 f3 ||1s; cat" may be considered as corresponding to the input provisioning event as both the command separator (";") and the executable product ("rm") appear, even if they appear differently, in a different order, without all textual portions of the input (e.g., without the character "*"), with additional text and characters in between the different portions, or the like. In some exemplary embodiments, some characters may be ignored, such as characters that are modified by the command interpreter, e.g., characters invoking file name generation mechanism, characters invoking alias resolution, or the like. In other embodiments, it may be required that the execution command retain, at least, the order between the command separator and the executable product.

In some exemplary embodiments, Step 280 may be performed with respect to each recorded event in the suspicious events database (e.g., 135 of FIG. 1). Additionally, or alternatively, the correlation may be investigated only with respect to non-invalidated records. For example, if a record is invalidated due to the passage of time, correlation between the event represented thereby and the execution command may not checked.

On Step 290, a command is flagged as a command injection attack in view of the correlation determined in Step 280. If no correlation is found, the command may be considered as not being associated with a command injection attack.

On Ste 295, remedial action may be taken with respect to the flagged command. The flagged command may be reported to a user, reported to an administrator, logged, or the like. Additionally, or alternatively, the remedial action may be an action to prevent the adverse effects of the attack, such as by preventing execution of the flagged execution command.

Figure 2B:
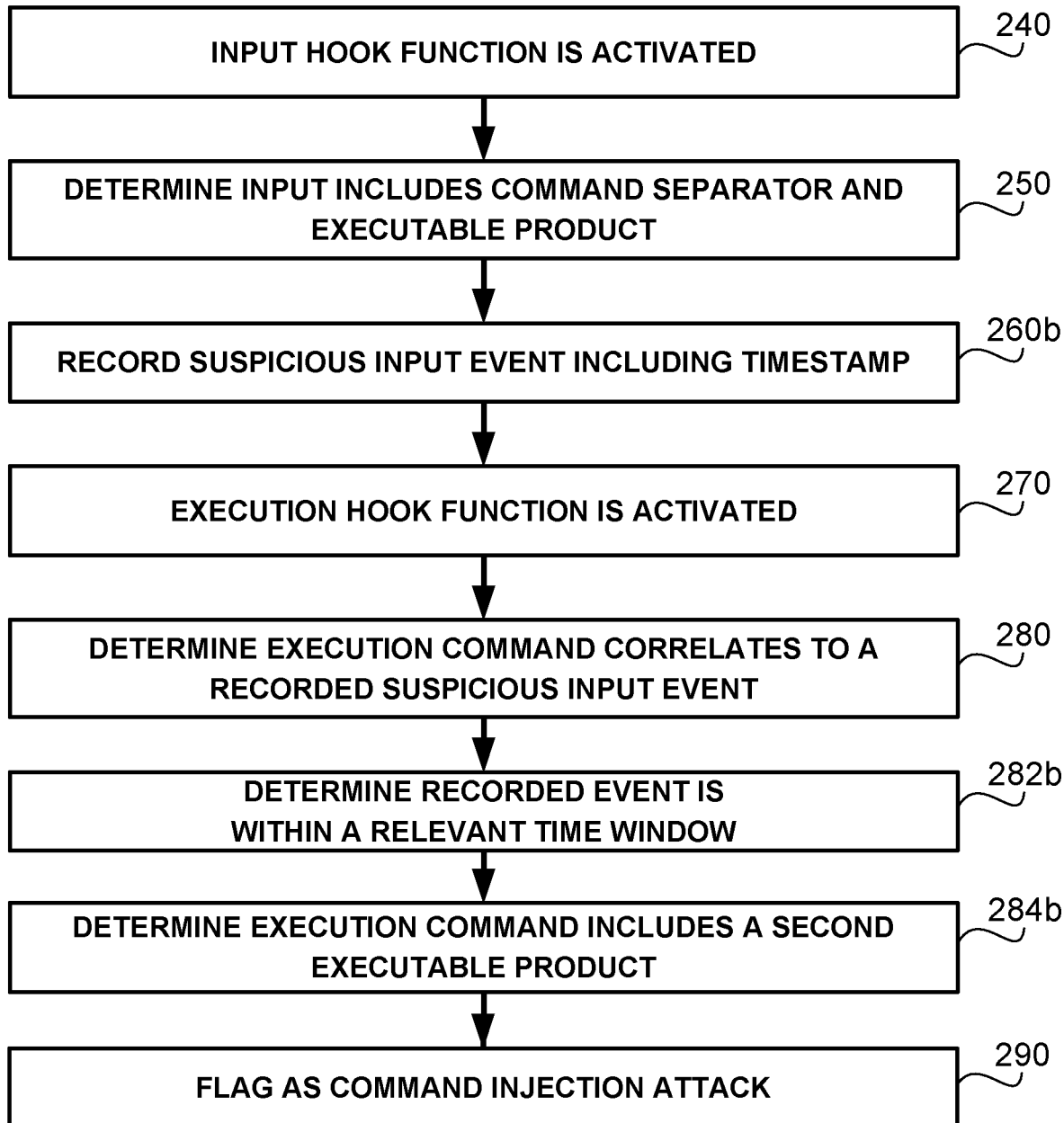

Referring now to FIG. 2B showing a flowchart diagram of a method, in accordance with some exemplary embodiments of the disclosed subject matter.

On Step 260b, the suspicious input event may be recorded, similarly to Step 260 of FIG. 2A. In some exemplary embodiments, the timestamp of the input provisioning event is recorded in the suspicious input event. In some exemplary embodiments, the record may be a tuple: (separator, binary name, detection_time), where separator is the identified command separator, the binary name is the name of the execution product, and detection time is the detection time of the input provisioning event. Detection_time may be the time in which the input hook function was activated.

On Step 282b, it may be determined if a record suspicious input event occurred within a relevant time window. The relevant time window may be a recent time window of a predetermined size, also referred to as a "valid period". The valid period may be predetermined. An administrator may set and modify the valid period parameter. In some cases, increasing the valid period may reduce likelihood that an attack may be discovered. However, on the other hand, such an increase may also increase the likelihood of a false positive detection. In some exemplary embodiments, the valid period may be defined in seconds, in minutes, in dozens of minutes, or the like.

In some exemplary embodiments, input events may not persist over system reboots and the database of suspicious events may be emptied in each boot of the system. In some exemplary embodiments, there may be an additional ledger for logging events which may persist and which may be used for manual analysis, investigation or the like. However, such a ledger may not necessarily be used in accordance with the disclosed subject matter.

On Step 284b, it may be determined that the execution command comprises a second executable product in addition to the executable product appearing in the recorded suspicious input event. In some exemplary embodiments, a command injection attack may attempt to cause an execution of a benign command to cause malicious side-effects. For example, the command "ls" to which an input provided from the network may be concatenated as the parameter, may be utilized by a command injection attack. The network input may be "; rm*", and the execution command may be "ls; rm*". As can be appreciated, in such a scenario there are two executable products ("ls" and "rm"). It is also noted that the two executable products may be the same (e.g., "rm" and "rm"). In some exemplary embodiments, the existence of the two executable products may be indicative of the usage of the execution command of the command separator (e.g., in this example ";") for the purpose of separating two commands and not for other usages (e.g., as a character in a string).

Figure 2C:
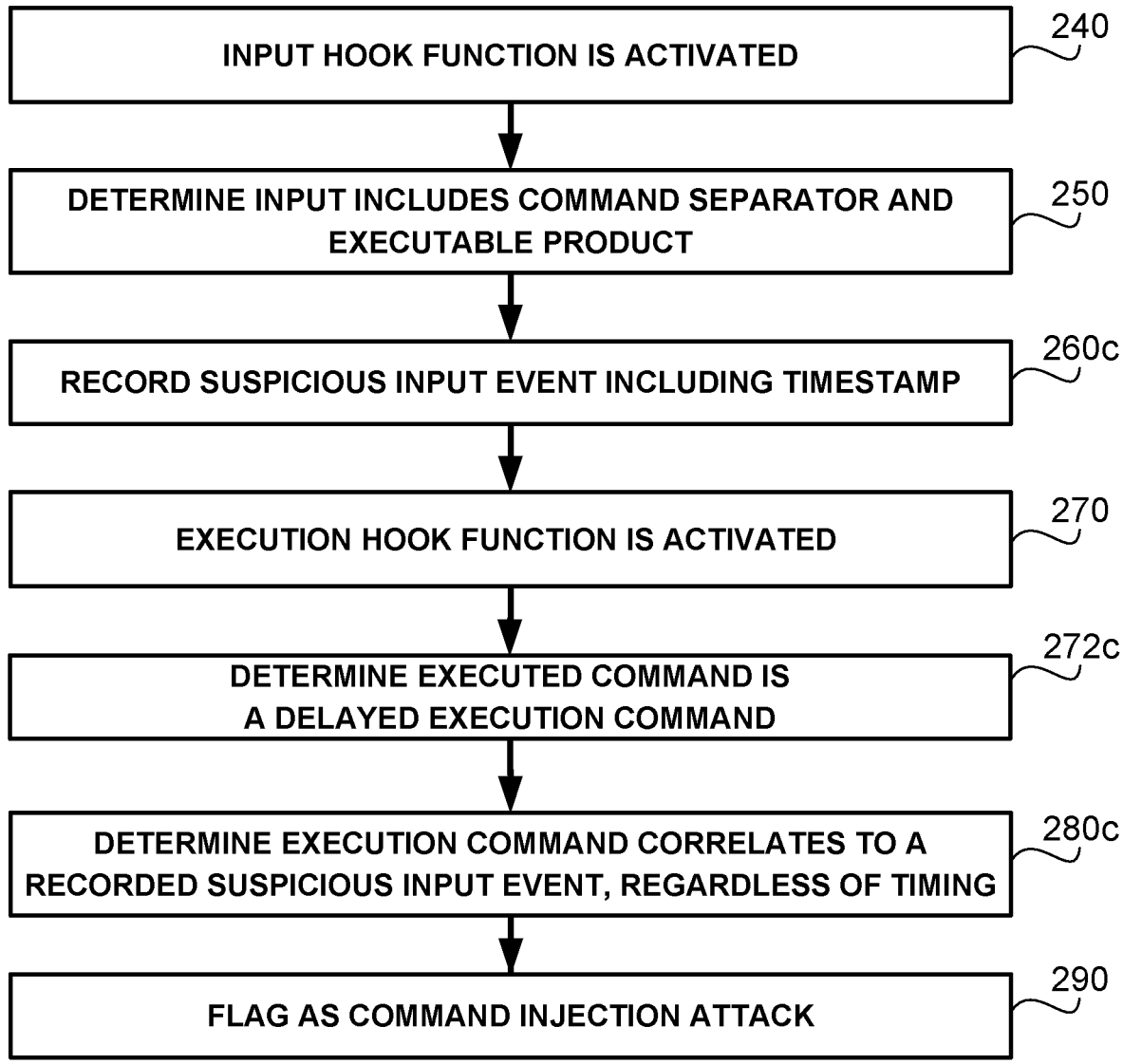

Referring now to FIG. 2C showing a flowchart diagram of a method, in accordance with some exemplary embodiments of the disclosed subject matter.

On Step 260c, similarly to Step 260b, a suspicious event is recorded with a timestamp.

During performance of the execution hook function (270), Steps 272c and 280c may be performed.

On Step 272c, a determination may be made as to the nature of the command that is being executed. Specifically, it may be determined that the executed command may be a delayed execution command, such as a command executed by a "crond" process in LINUX™. Because the execution is a delayed execution, it may have been affected by an old input provisioning event. Hence, on Step 280c, the correlation between the execution command and recorded suspicious input events is performed, similarly to the correlation described regarding Step 280, but explicitly regardless of timing of the recorded suspicious input event. In some exemplary embodiments, a correlation may be determined based on both the execution command and the recorded suspicious input event including the same command separator and the same executable product. In some exemplary embodiments, due to the execution performed by the delayed execution mechanism (e.g., the "crond" process), a second executable product may not necessarily appear and such requirement (e.g., as described regarding Step 284b) may be optional.

It is noted that in some embodiments, time correlation may be performed (e.g., as illustrated in Step 282b of FIG. 2B) for other commands, while for delayed execution commands timing may be disregarded.

Figure 2D:
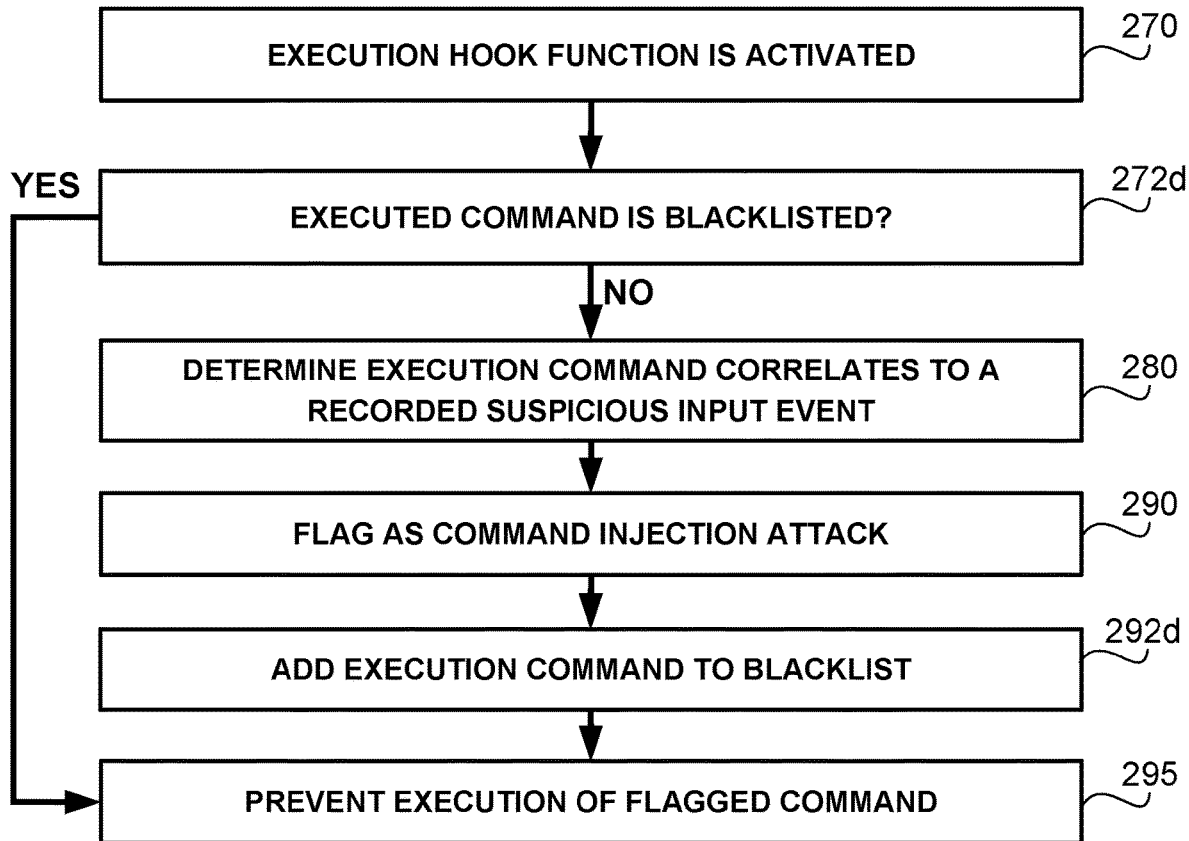

Referring now to FIG. 2D showing a flowchart diagram of a method, in accordance with some exemplary embodiments of the disclosed subject matter.

FIG. 2D exemplifies a mechanism of blacklisting execution commands that were previously flagged. The flagging mechanism may be any mechanism, in accordance with the disclosed subject matter, such as requiring time-based correlation, correlation irrespective of timing, correlation depending on a specific type of command, or the like. The flagging mechanism is illustrated by Steps 280-290.

On Step 292d, the flagged execution command may be added to a blacklist. The blacklist may be implemented using a hash key, and for each hash value, a list of blacklisted execution commands having the same hash value may be retained.

Additionally, or alternatively, a bloom filter may be utilized. In some cases, the data structure used to retain the blacklist may be a data structure that can be queried efficiently (e.g., O(1) computation complexity, such as in case of Bloom Filter or hash table).

When the execution function is activated once again (Step 270), before analyzing the executed command based on correlation to recorded suspicious events (Step 280), Step 272*d* may be performed. On Step 272*d*, the blacklist may be consulted to determine whether the execution command was already blacklisted. The determination may be based on an identical execution command appearing in the blacklist. In some cases, even a difference in one character may be considered sufficient for two execution commands to be considered different for the purpose of the blacklist.

If the execution command is blacklisted, no analysis needs to be performed, and Steps 280-292*d* may be skipped. Remedial actions, such as prevention of the execution of the command, may be performed (Step 295).

It is noted, that such a blacklist mechanism provides an improved operation, as the backlist may be more efficient and work in O(1) computational complexity, as opposed to the correlation determination of Step 280, which may require more computational resources. In addition, in case the correlation is time-based, retrial execution attempts may not be detected as command injection attacks, due to the passage of time. The use of a blacklist ensures that if the same command is attempted to be executed again, as may occur in different execution environments, such as attempting several execution attempts until a timeout is issued, the execution command may still be blocked from execution. In some cases, logging of a retrial execution attempt may be different from a logging of a newly discovered command injection attack, as the later is a new attack and the former may be merely a second attempt to execute the same command and may not indicate of another malicious event occurring. Put differently, in some cases, the retrial attempt may be the outcome of normal operation of the execution environment and may be handled differently than an identification of another attack attempt.

Figure 2E:
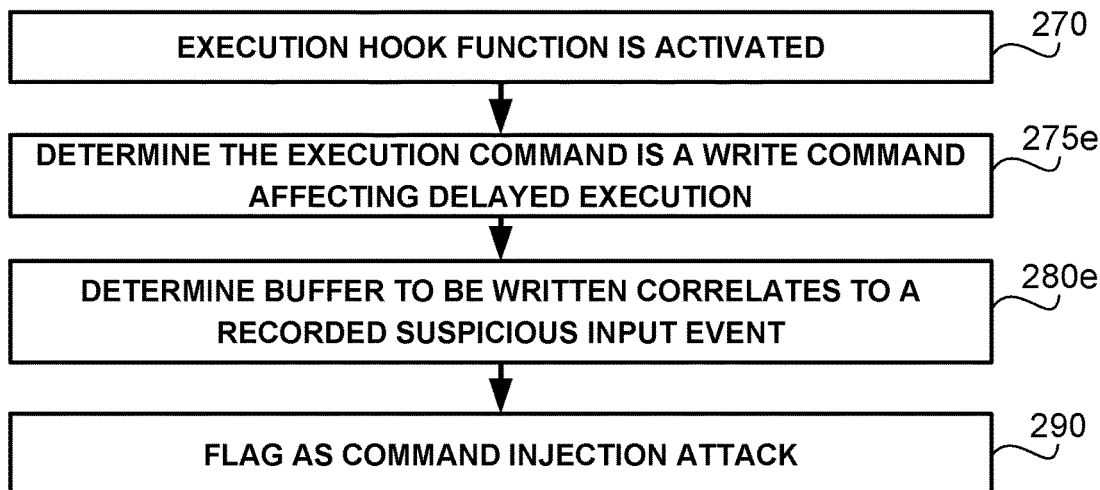

Referring now to FIG. 2E showing a flowchart diagram of a method, in accordance with some exemplary embodiments of the disclosed subject matter.

On Step 275*e*, it may be determined whether the execution command is a write command affecting delayed execution. For example, the execution command may update the "crontab" file which serves as a configuration file for the "crond" process in LINUX™ Such a write operation may cause execution later on.

On Step 280*e*, the buffer to be written by the write command may be analyzed. The buffer may be analyzed to locate a correlation between its content with a recorded suspicious input event. It is noted that the correlation may be time-dependent, as opposed to Step 280*c*. This is due to the fact that the execution of the write command itself may be performed in proximity in time to the receipt of the malicious input, as opposed to the execution of the delayed execution command itself, which may occur a significant time later, such as days and even years.

Figure 2F:
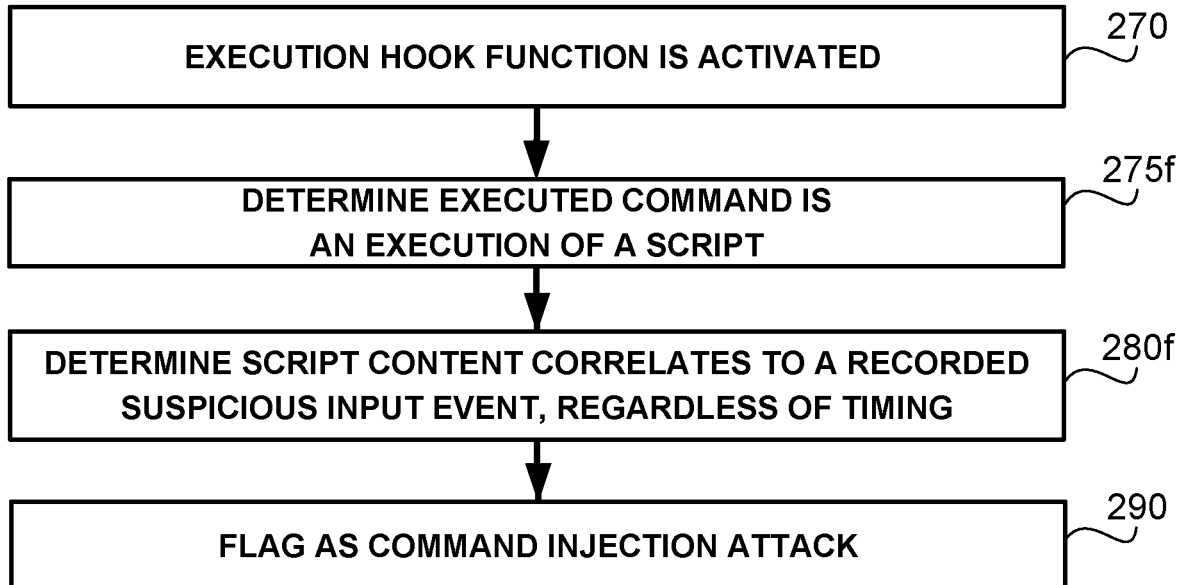

Referring now to FIG. 2F showing a flowchart diagram of a method, in accordance with some exemplary embodiments of the disclosed subject matter.

On Step 275*f*, similarly to Step 275*e* of FIG. 2E, a determination is made based on the executed command itself. FIG. 2F depicts the case where the execution command is a command to execute a script file. The script file may be identified using a classifier, such as trained using any machine learning method. The script file may be identified based on the usage of a shebang character sequence, based on the suffix of the file name, based on known script files in the execution environment (e.g., "profile" file, ".bashrc" file, ".login" file, or the like that are relevant from in some LINUX™ configurations), based on the file being a textual file and having a execution permissions, or the like. In some exemplary embodiments, if the execution command requires the execution of a command interpreter (e.g., a shell, such as "sh", "csh", "bash", or the like, a different command interpreter such as "perl", "awk", or the like), the parameter provided to the command interpreter may be considered as a script file. In some exemplary embodiments, a list of available script files in the execution environment may be populated in advance. The population may be performed on boot, periodically, or the like.

On Step 280*f*, correlation may be searched for between the content of the script file and suspicious input event. Step 280*f* may be similar to Step 280*e*. In some exemplary embodiments, the correlation may be a correlation that disregards timing of the suspicious input event. In some exemplary embodiments, the list of suspicious events may not be considered time-invalidated, even if the valid time period has elapsed. In some exemplary embodiments, the content of the script file may be loaded into a buffer and a match for a recorded event (e.g., a match in the form of "{separator binary}" may be considered as a correlation.

Figure 2G:
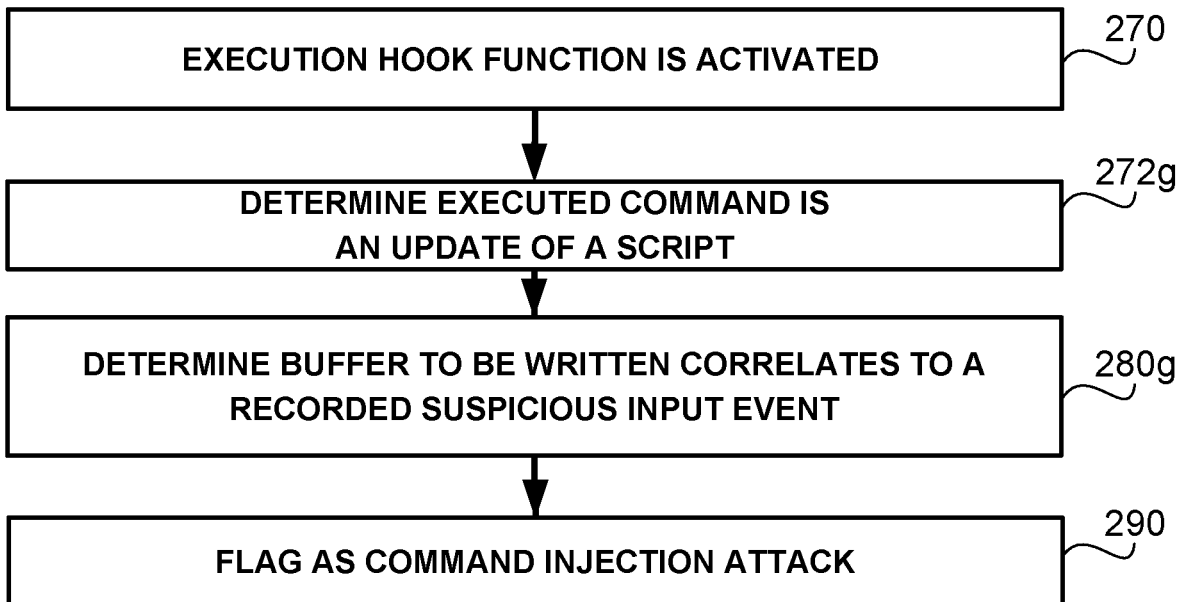

Referring now to FIG. 2G showing a flowchart diagram of a method, in accordance with some exemplary embodiments of the disclosed subject matter. FIG. 2G illustrates an embodiment that provides a specific functionality when a script is updated.

On Step 272*g*, a determination is made to detect that the executed command is an update of a script. The executed command may be a command that updates a file, appends content to a file, or the like. The update of the file may be implicit or explicit. For example, the file may be updated using output redirection instructions (e.g., "cmd>file"), using a command that writes into a file, or the like. In some exemplary embodiments, the execution hook function may be set up to catch an attempt to update a file in a filesystem. Once the execution hook function is activated, the file being updated may be investigated.

The determination of whether the file is a script may be similar to the determination described with relation to Step 275*f* of FIG. 2F.

On Step 280*g*, the content of the buffer to be written may be examined. If the content correlates to a recorded suspicious input event, Step 290 may be performed and the execution command may be flagged. In some exemplary embodiments, Step 280*g* may be performed so as to determine a time-dependent correlation. In some exemplary embodiments, Step 280*g* may be performed similarly to Step 280*e*.

Figure 2H:
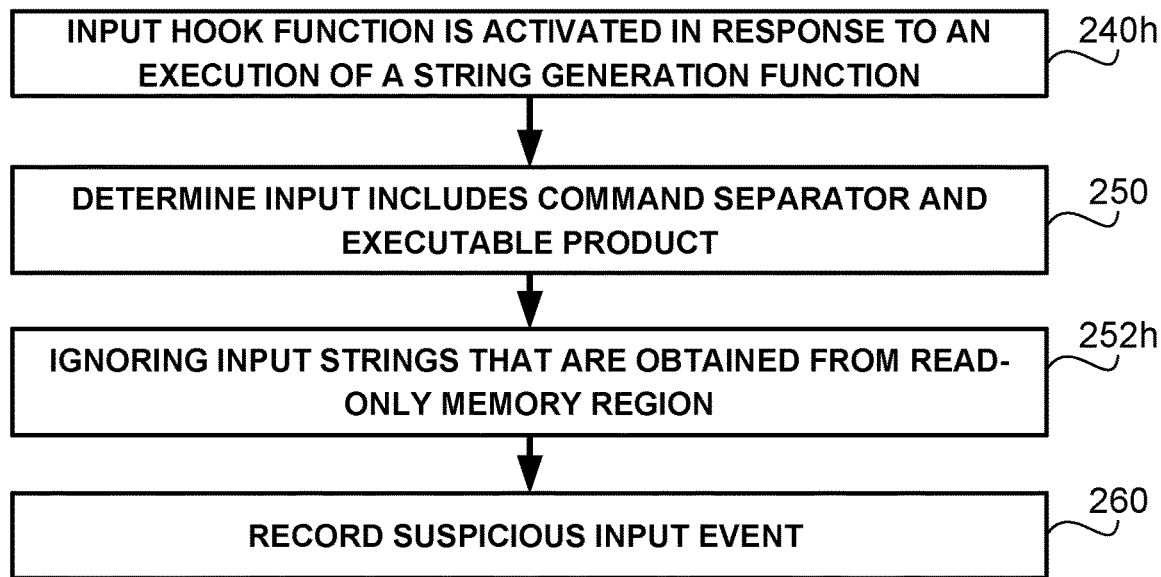

Referring now to FIG. 2H showing a flowchart diagram of a method, in accordance with some exemplary embodiments of the disclosed subject matter. FIG. 2H illustrates an embodiment that relates to input provisioning event related to string generation.

On Step 240*h*, the input hook function is activated in response to an execution of a string generation function. There may be a list of string generation functions that are available in the execution environment and which may be used for malicious purposes, such as for manipulating strings to generate a string to be used as an execution command.

On Step 252h, origin of input strings of the string generation function may be determined. Input strings that are obtained from read-only memory regions may be ignored, even if they comprise command separators and executable products. In some exemplary embodiments, a whitelist table may be generated and used to track input strings to be ignored. In some exemplary embodiments, whitelist entries may be time-invalidated after the valid time period elapses.

Other input strings that do not originate from read-only memory regions may be considered as suspicious. In some exemplary embodiments, if one of the input strings is suspicious, then the output of the string generation function is considered as a suspicious input event. Additionally, or alternatively, on Step 250, if any non-whitelisted input string comprises a command separator and if any non-whitelisted input string comprises an executable product—be the two input strings the same or different—the output of the string generation function may be considered as suspicious and recorded (260). In some exemplary embodiments, the input strings that are investigated may exclude the format-string of a string generation function of the printf functions family.

In some exemplary embodiments, the suspicious input event recorded in Step 260 may record the output of the string generation function.

Figure 3:
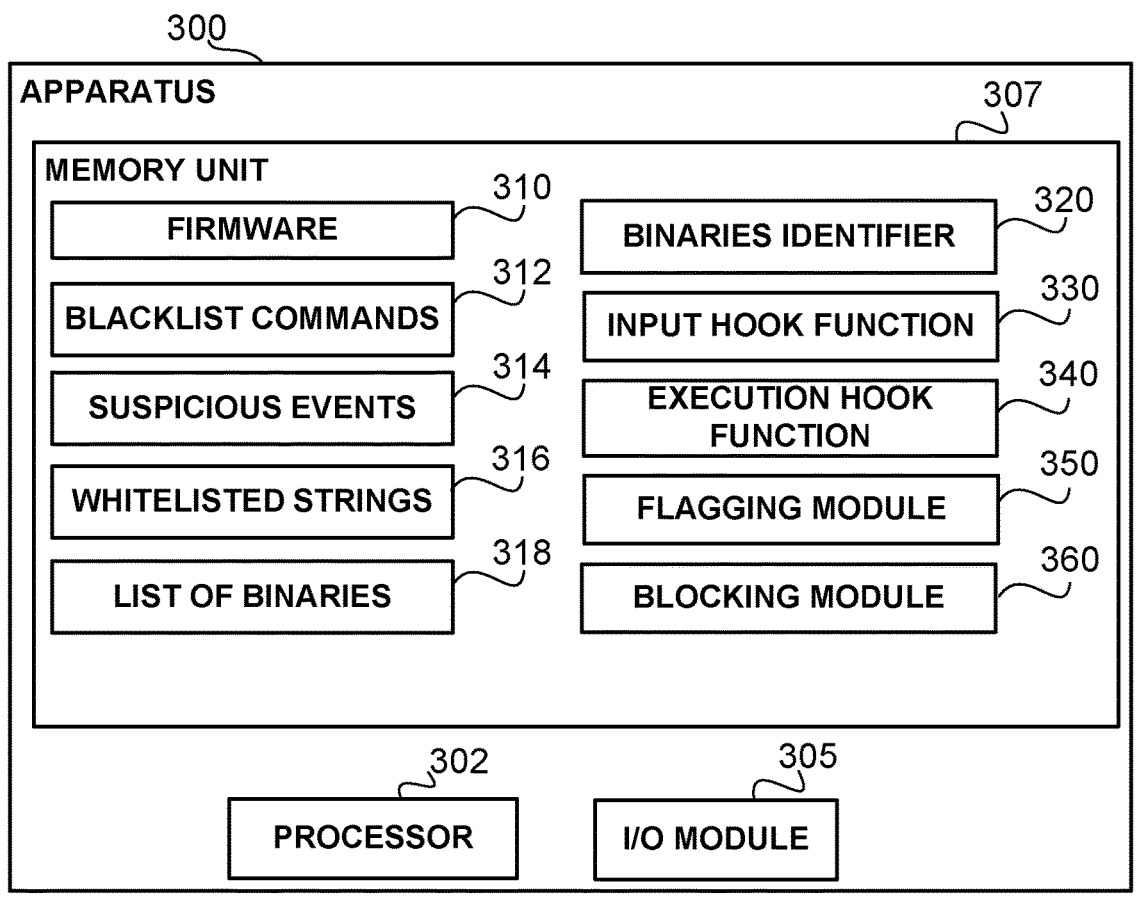
FIG. 3 shows a block diagram of an apparatus, in accordance with some exemplary embodiments of the disclosed subject matter.

Referring now to FIG. 3 showing a block diagram of components of an apparatus, in accordance with some exemplary embodiments of the disclosed subject matter.

In some exemplary embodiments, an Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of its subcomponents. Processor 302 may be configured to execute computer-programs useful in performing the method of FIGS. 2A-2G, or the like.

In some exemplary embodiments of the disclosed subject matter, an Input/Output (I/O) Module 305 may be utilized to provide an output to and receive input from a user. I/O Module 305 may be operatively coupled to a firmware device (not shown) intended for inspection and verification. I/O Module 305 may be operatively coupled to a display (not shown), speaker (not shown) or a similar device which may be used for providing feedback to the user. I/O Module 305 may further be used to transmit and receive information to and from the user, a firmware, a firmware device, or any other apparatus in communication therewith.

In some exemplary embodiments, Apparatus 300 may comprise a Memory Unit 307. Memory Unit 307 may be a short-term storage device or long-term storage device. Memory Unit 307 may be a persistent storage or volatile storage. Memory Unit 307 may be a disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300. In some exemplary embodiments, Memory Unit 307 may retain program code operative to cause Processor 302 to perform acts associated with any of the steps in FIGS. 2A-2H.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

In some exemplary embodiments, Firmware 310 may be the target executable that is being protected. In some exemplary embodiments, Firmware 310 may be executed using an execution environment. In one illustrative example. Apparatus 300 may be an IoT device that is operated by Firmware 310.

In some exemplary embodiments, Binaries Identifier 320 may be configured to identify available binaries for execution in Apparatus 300. In some exemplary embodiments, Binaries Identifier 320 may be configured to scan the file system on Memory Unit 307 to locate binaries and executable scripts. Binaries Identifier 320 may maintain a List of Binaries 318. In some exemplary embodiments, Binaries Identifier 320 may periodically verify each binary or script in List of Binaries 318 does exist, such as by checking the existence of the file in the file system at the specified path. In some exemplary embodiments, Binaries Identifier 320 may operate periodically. Additionally, or alternatively, Binaries Identifier 320 may be invoked upon system boot. Additionally, or alternatively, List of Binaries 318 may be populated in an offline manner and remain static, as it may be assumed no new binaries and scripts are installed on Apparatus 300.

In some exemplary embodiments, Input Hook Function 330 may be a function that is set up to be invoked in response to a potential input provisioning event, such as receiving a network request, string generation, or the like. In some exemplary embodiments, Input Hook Function 330 may be configured to determine whether the input is a suspicious input that includes a binary or other executable product listed in List of Binaries 318 and a command separator. In some exemplary embodiments, in response to the identification of suspicious input, Input Hook Function 330 may record an event in Suspicious Events 314. In some exemplary embodiments, the event may be recorded with a timestamp indicating its occurrence time. In some exemplary embodiments, Input Hook Function 330 may record an output string of a string generation function that is considered suspicious due to being compiled of an executable product listed in List of Binaries and a command separator. In some exemplary embodiments, Input Hook Function 330 may determine the memory region from which each input string is obtained. Strings originating from read-only memory area may be considered as hard-coded and not part of a command injection attack. Such strings may be added to Whitelisted Strings 316, to allow ignoring their appearance in the determination of whether or not the potential input provisioning event is suspicious.

In some exemplary embodiments, Execution Hook Function 340 may be configured to be invoked when a command is being executed within the execution environment. In some exemplary embodiments, Execution Hook Function 340 may be configured to determine whether an execution command correlates with a suspicious event recorded in Suspicious Events 314. In some exemplary embodiments, the correlation may require time-correlation. Additionally, or alternatively, the correlation may be based on a content of a buffer, such as a buffer into which a content of a script is loaded, a buffer to be written to Memory Unit 307, or the like. In some exemplary embodiments, the functionality of Execution Hook Function 340 may differ depending on the execution command. For example, an execution of a write command may be treated differently than a delayed execution. Additionally, or alternatively, an execution of a text-based script may be treated differently than a command attempting to update a content of such script.

In some exemplary embodiments, in case Execution Hook Function 340 determines that there is a correlation between a recorded event in Suspicious Events 314 and with the execution command, Flagging Module 350 may be invoked. Flagging Module 350 may flag the execution command as a command injection attack. In some exemplary embodiments, Flagging Module 350 may activate a remedial action, such as blocking the execution of the command by Blocking Module 360.

In some exemplary embodiments, Flagging Module 350 may be configured to add the execution command to Blacklist Commands 312. In some exemplary embodiments, Execution Hook Function 340 may be configured to invoke Blocking Module 360, a remedial action, Flagging Module 350 or the like, in response to command being executed appearing in Blacklist Commands 312. In such a case, the same command was previously flagged, and no analysis may be required to make the same determination again.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium retaining program instructions, which program instructions when read by a processor, cause the processor to perform:
    configuring an input hook function to be executed in response to a potential input provisioning event,
    wherein the input hook function is configured to perform:
        analyzing a potential input of the potential input provisioning event to identify whether the potential input comprises a command separator and an executable product; and
        in response to identifying the command separator and the executable product, recording a suspicious input event indicating the command separator and the executable product;
    configuring an execution hook function to be executed in response to a potential execution event,
    wherein the execution hook function is configured to perform:
        in response to a determination that an execution command of the potential execution event comprises the command separator and the executable product of the suspicious input event, flagging the execution command as a command injection attack.

2. The computer program product of claim 1, wherein said program instructions, when read by a processor, cause the processor to perform: preventing execution of a command that is flagged as a command injection attack.

3. The computer program product of claim 1, wherein said program instructions, when read by a processor, cause the processor to perform:
    obtaining a list of executable products available for execution in an execution environment;
    wherein the execution hook is configured to be executed in response to the potential execution event occurring in the execution environment; and
    wherein the executable product is listed in the list of executable products available for execution in the execution environment.

4. The computer program product of claim 1, wherein said flagging the execution command as a command injection attack is contingent on the execution command comprising a second executable product.

5. The computer program product of claim 1, wherein in response to said flagging, adding the execution command to a blacklist of prohibited commands; wherein the execution hook function is further configured to flag a command as the command injection attack in response to identifying that the command is included in the blacklist of prohibited commands, whereby preventing retrial execution attempts of the command injection attack.

6. The computer program product of claim 1, wherein the determination that the execution command comprises the command separator and the executable product of the suspicious input event, further comprises a determination that the execution command is a write command affecting delayed execution of another command.

7. The computer program product of claim 6, wherein the write command is a command to update a configuration file utilized by a delayed execution process.

8. The computer program product of claim 1, wherein the determination that the execution command comprises the command separator and the executable product of the suspicious input event, further comprises a determination that the execution command is a command to write to an executable script file.

9. The computer program product of claim 1, wherein the execution command is a command to execute an executable script file, wherein the determination that the execution command comprises the command separator and the executable product is performed with respect to a content of the executable script file.

10. The computer program product of claim 1, wherein the potential input provisioning event is an execution of a string generation function.

11. The computer program product of claim 1, wherein the potential input provisioning event is a network data receipt event, whereby the input hook function is a network hook function configured to analyze potential input received from a network.

12. A method comprising:
    configuring an input hook function to be executed in response to a potential input provisioning event,
    wherein the input hook function is configured to perform:
        analyzing a potential input of the potential input provisioning event to identify whether the potential input comprises a command separator and an executable product; and
        in response to identifying the command separator and the executable product, recording a suspicious input event indicating the command separator and the executable product;

configuring an execution hook function to be executed in response to a potential execution event,
wherein the execution hook function is configured to perform:
in response to a determination that an execution command of the potential execution event comprises the command separator and the executable product of the suspicious input event, flagging the execution command as a command injection attack.

13. The method of claim 12 further comprising preventing execution of a command that is flagged as a command injection attack.

14. The method of claim 12 further comprising:
obtaining a list of executable products available for execution in an execution environment;
wherein the execution hook is configured to be executed in response to the potential execution event occurring in the execution environment; and
wherein the executable product is listed in the list of executable products available for execution in the execution environment.

15. The method of claim 12, wherein the determination that the execution command comprises the command separator and the executable product of the suspicious input event, further comprises a determination that the execution command is a write command affecting delayed execution of another command or a command to write to an executable script file.

16. A computerized apparatus having a processor, the processor being adapted to perform the steps of:
configuring an input hook function to be executed in response to a potential input provisioning event,
wherein the input hook function is configured to perform:
analyzing a potential input of the potential input provisioning event to identify whether the potential input comprises a command separator and an executable product; and
in response to identifying the command separator and the executable product, recording a suspicious input event indicating the command separator and the executable product;
configuring an execution hook function to be executed in response to a potential execution event,
wherein the execution hook function is configured to perform:
in response to a determination that an execution command of the potential execution event comprises the command separator and the executable product of the suspicious input event, flagging the execution command as a command injection attack.

17. The computerized apparatus of claim 16, wherein said processor being further adapted to perform: preventing execution of a command that is flagged as a command injection attack.

18. The computerized apparatus of claim 16, wherein said processor being further adapted to perform:
obtaining a list of executable products available for execution in an execution environment;
wherein the execution hook is configured to be executed in response to the potential execution event occurring in the execution environment; and
wherein the executable product is listed in the list of executable products available for execution in the execution environment.

19. The computerized apparatus of claim 16, wherein the determination that the execution command comprises the command separator and the executable product of the suspicious input event, further comprises a determination that the execution command is a write command affecting delayed execution of another command or a command to write to an executable script file.

20. The computerized apparatus of claim 16, wherein the potential input provisioning event is a network data receipt event, whereby the input hook function is a network hook function configured to analyze potential input received from a network.

* * * * *